No. 837,808. PATENTED DEC. 4, 1906.
J. DILLON.
HORSESHOE.
APPLICATION FILED MAR. 17, 1906.
2 SHEETS—SHEET 1.
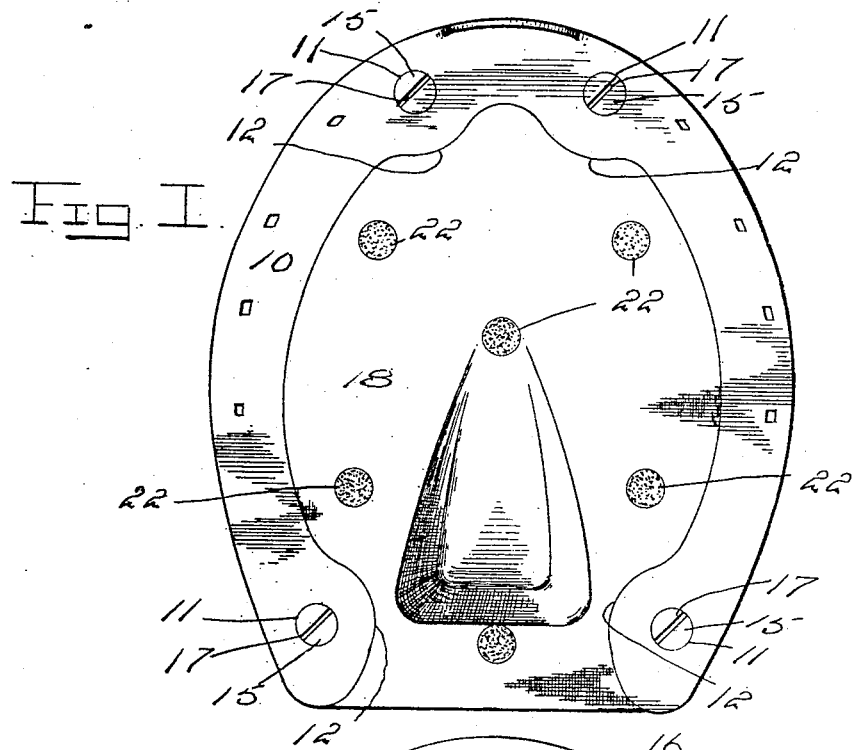
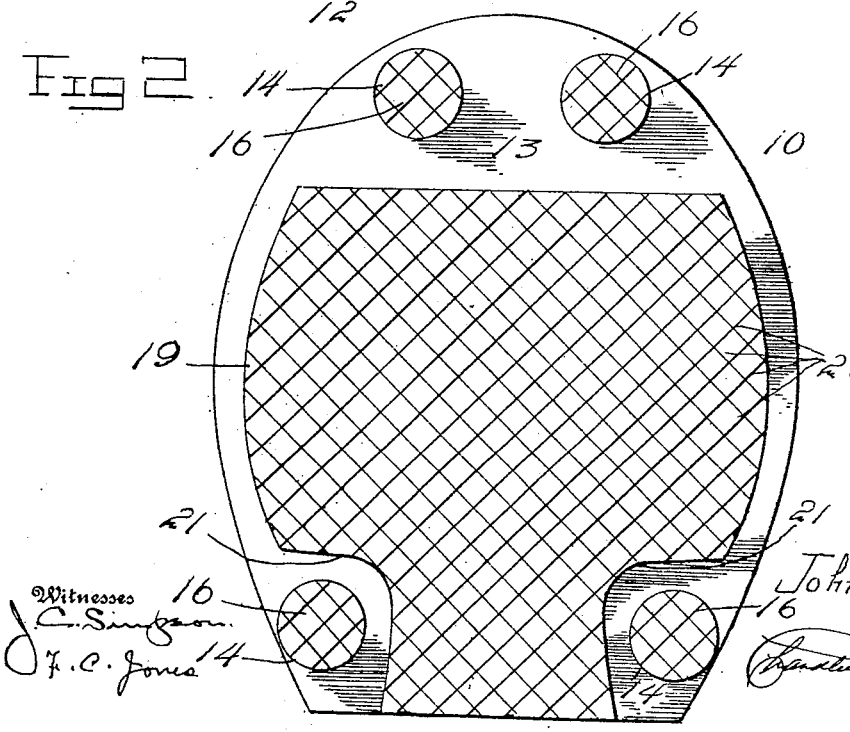

No. 837,808.  
PATENTED DEC. 4, 1906.  
J. DILLON.  
HORSESHOE.  
APPLICATION FILED MAR. 17, 1906.

2 SHEETS—SHEET 2.

Witnesses  
J. C. Simpson  
J. C. Jones

Inventor  
John Dillon.  
By Chandler & Chandler  
Attorneys

THE NORRIS PETERS CO., WASHINGTON, D. C.

UNITED STATES PATENT OFFICE.

JOHN DILLON, OF HACKENSACK, NEW JERSEY.

HORSESHOE.

No. 837,808.     Specification of Letters Patent.     Patented Dec. 4, 1906.

Application filed March 17, 1906. Serial No. 306,653.

*To all whom it may concern:*

Be it known that I, JOHN DILLON, a citizen of the United States, residing at Hackensack, in the county of Bergen, State of New Jersey, have invented certain new and useful Improvements in Horseshoes; and I do hereby declare the following to be a full, clear, and exact description of the invention, such as will enable others skilled in the art to which it appertains to make and use the same.

This invention relates to horseshoes, and has for its object to provide a horseshoe having a plate of sheet metal or the like secured to its upper side by means of detachable calks and having secured to its opposite sides plates of rubber or other elastic material, one of the said plates contacting with the under side of the horse's hoof to prevent injury thereto and to cushion the impact of the hoof with the road-bed and the other of said plates serving to prevent slipping of the horse when traveling over icy roads.

A further object of the invention is to provide a novel construction of calk the construction being one which may be readily applied to and removed from a horseshoe and which when in position will effectually prevent slipping of the animal.

Figure 3:
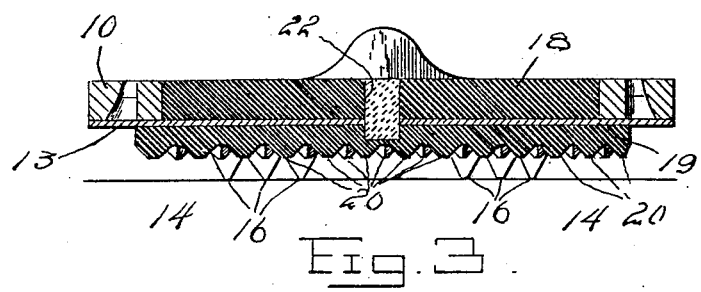
Figure 4:
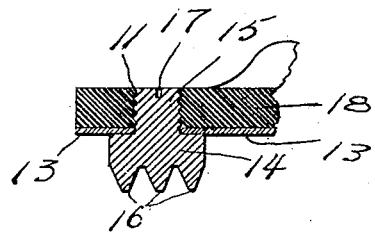
Figure 5:
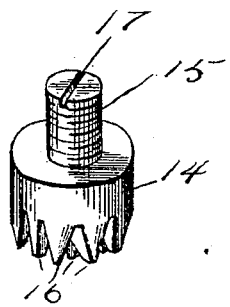

In the accompanying drawings, Figure 1 is a top plan view of a horseshoe constructed in accordance with my invention. Fig. 2 is a bottom plan view thereof. Fig. 3 is a detail transverse sectional view through the same. Fig. 4 is a similar view taken in a line with one of the calks, and Fig. 5 is a detail perspective view of one of the calks.

Referring to the drawings, the numeral 10 denotes a horseshoe of the ordinary construction with the exception that the shoe is provided with threaded openings 11, the inner edge of the shoe adjacent the said openings being bulged, as at 12, to strengthen the shoe.

The numeral 13 designates a plate of sheet metal or other rigid material whose outer edge registers with the outer edge of the horseshoe and which is secured detachably upon the said shoe by means of calks 14, having each a threaded stem 15 designed for engagement in one of the threaded openings 11. The faces of the calks which contact with the road-bed are provided each with a plurality of points or spurs 16, which are formed by cutting in the said faces of the calks intersecting V-shaped grooves. In order that the calks may be readily applied to and removed from the shoe, I provide in the end of the stem 15 of each calk a groove 17 for the reception of the end of a screw-driver, as will be readily understood. Located upon the opposite side of the plate 13 are plates 18 and 19, of rubber or other elastic material, the plate 18 being located above the plate 13 and the plate 19 being located below the same. The plate 18 is recessed in its upper face and adjacent its rear edge for the reception of the frog of the horse's hoof, as will be readily understood, and the said plate has its outer edge conforming to the contour of the inner edge of the shoe, as shown in Fig. 2. The plate 19 has a plain upper face and a serrated under face 20, the said serrations being formed, as in the case of the calks 14, by forming in the said face a number of intersecting V-shaped grooves. The forward edge of the plate 19 terminates slightly short of the calks which are located at the front of the shoe and the rear corners of the plate are cut away, as at 21, to accommodate the calks at the rear end of the shoe. In practice the plate 13 is provided with a plurality of openings 22 and the said elastic plates 18 and 19 after having been placed in their proper positions upon the opposite sides of the plate 13 are mutually cemented at the said openings 22 in the plate 13.

What is claimed is—

1. In a device of the class described, the combination with a horseshoe, of a plate detachably secured to said shoe, and cushion-plates secured upon opposite sides of said first-named plate, said cushion-plates being entirely separate and joined by a cement bond.

2. In a device of the class described the combination with a horseshoe, of a plate detachably secured to the shoe, said plate being provided with a plurality of openings, cushion-plates disposed on opposite sides of the first-named plate, said cushion-plates being distinct from each other and having openings registering with openings in the first-named plate, and a cement bond located in each of the registering openings of the first and last named plates whereby the latter are mutually connected.

3. In a device of the class described, the combination with a horseshoe, of a plate detachably secured to said shoe, said plate having openings formed therethrough, and mutually-cemented elastic plates disposed upon the opposite sides of said first-named plates, said cushion-plates being entirely separate and joined by a cement bond.

4. In a device of the class described, the combination with a horseshoe, of a plate detachably secured upon said shoe and rubber pads disposed upon opposite sides of the plate and provided with openings which register with the openings in the plate, there being cement flowed into the openings to mutually bond the rubber pads.

In testimony whereof I affix my signature in presence of two witnesses.

JOHN DILLON.

Witnesses:
GEO. MCCLEARY,
JOHN J. V. BURKE.